United States Patent
Melia et al.

(12) 
(10) Patent No.: US 6,196,029 B1
(45) Date of Patent: Mar. 6, 2001

(54) LOW PROFILE BUSHING FOR MAKING FIBERS

(75) Inventors: Kurt George Melia, Goshen, KY (US); Russell Donovan Arterburn, Athens, TN (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 08/330,168

(22) Filed: Oct. 27, 1994

(51) Int. Cl.⁷ ................................................ C03B 37/02
(52) U.S. Cl. ................................................ 65/499; 65/495
(58) Field of Search .......................... 65/475, 385, 493, 65/495, 449, 498; 425/72.2, 198, 464

(56) References Cited

U.S. PATENT DOCUMENTS

| | | | |
|---|---|---|---|
| 2,947,028 | * 8/1960 | Slayter | 65/498 |
| 3,512,948 | * 5/1970 | Glaser | 65/499 |
| 4,285,711 | * 8/1981 | Willis | 65/495 |
| 4,433,991 | * 2/1984 | Melan | 65/495 |
| 4,488,891 | * 12/1984 | Grubka | 65/495 |
| 4,536,202 | * 8/1985 | Perkins | 65/499 |
| 4,740,224 | 4/1988 | Fowler | 65/495 |

FOREIGN PATENT DOCUMENTS

380596 * 5/1973 (SU) ............................ 65/495

* cited by examiner

Primary Examiner—John Hoffmann
(74) Attorney, Agent, or Firm—John H. Miller

(57) ABSTRACT

A precious metal bushing used for fiberizing molten glass through nozzles protruding from the lower surface of an orifice plate in the bottom of the bushing requires a substantially reduced investment in precious metal by having very short sidewalls and endwalls such that the distance from the bottom surface of a flange at the top of the bushing to the top surface of the orifice plate is more than about 0.2 inch, but less than about 0.65 inch and preferably less than about 0.5 inch.

9 Claims, 4 Drawing Sheets

LOW PROFILE BUSHING FOR MAKING FIBERS

TECHNICAL FIELD

The invention involves a bushing apparatus and method for making fiber from a molten material such as molten glass. More particularly, the present invention involves a bushing apparatus and a method for making fiber that reduces investment while providing a more uniform temperature profile across the orifice plate of the bushing.

BACKGROUND ART

In the manufacture of fiber from molten material, such as molten glasses, it has been common practice to use a bushing made of precious metal alloy. Precious metals are platinum, rhodium, palladium, ruthenium, and iridium. The bushings are electrically heated by their own resistance and are box-like, open on the top and comprise an orifice plate containing many nozzles or tips welded therein, sidewalls, end walls, terminals on the endwalls for connecting electrical cables, a top flange for contacting the underneath side of a forehearth, and usually a perforated plate or screen parallel with, but mounted above, the orifice plate. Usually the bushings are made by cutting the parts from alloy of desired thickness and welding the parts together with similar alloy, but a part or all of the bushing can be made by casting and/or drawing as shown by U.S. Pat. Nos. 4,207,086 and 4,078,413, which disclosures are hereby incorporated by reference.

The depth of the bushing between the top of the bushing and the top of the orifice plate was thought important to allow the glass to homogenize in temperature and viscosity before reaching the nozzles so that there would be uniform flow through all of the nozzles. As the molten glass flows through the openings in the refractory floor of the forehearth, the refractories forming the openings are cooler than the molten glass and remove heat from the molten glass in contact with the refractories. This creates a temperature profile in the column of molten glass entering the bushing. Usually a perforated plate or screen spans the opening close to the top of the bushing and is electrically heated to attempt to remove temperature differences in the glass and to bring the glass to a uniform, desired temperature for fiberization.

Removing the screen, and the sidewalls, from the bushing has been attempted with a much higher fiber break rate just below the bushing being the consistent result. It has been concluded that this higher break rate is caused by increased variation in the temperature and viscosity of the molten glass entering the nozzles due to the absence of the screen or the distance between the screen and the orifice plate, i.e. an insufficient length of the sidewalls in either case. As a result, the sidewalls were increased to try to achieve better glass uniformity. To conserve costly alloy, at least a substantial portion of the bushing sidewalls was made thinner than the orifice plate and the height of the sidewalls and endwalls exceeded at least three quarters of an inch, usually one inches or more, and frequently up to one and one half inch or more as evidenced by U.S. Pat. Nos. 4,272,271; 4,662,922 and 5,244,483, the disclosures of which are hereby incorporated by reference.

Because of the temperatures of the molten material being fiberized and the corrosiveness of the molten material, it is necessary to make the bushing from very expensive alloys like platinum-rhodium alloys typically containing 10–30% rhodium. These alloys are very expensive, usually exceeding seven thousand dollars per pound, and it is not unusual to have many tens of thousands of dollars tied up in each fiberizing position in alloy alone. Thus it has been desirable for decades to reduce the amount of alloy required while at least maintaining, and preferably improving, the variation in the temperature of the molten material entering the nozzles.

SUMMARY OF THE INVENTION

It is an object of the present invention to significantly reduce the amount of metal alloy needed for each fiberizing bushing while maintaining, and preferably improving, the temperature consistency of the molten material entering the nozzles in the orifice plate of the bushing.

Another object of the invention is a process of making fiber from a molten material by flowing the molten material through holes and/or nozzles in an orifice plate of an electrically heated bushing that requires significantly less investment in precious metal alloy than has been required with this type of process heretofore.

These objects are accomplished in the present invention by substantially reducing the height of the sidewalls and the endwalls of the fiberizing bushings and substantially reducing the depth of the bushings while maintaining, and usually improving, the consistency of the temperature and viscosity of the molten material entering the nozzles and/or orifices of the bushing.

The invention comprises a process of making fiber from a molten material by flowing the molten material into an electrically heated, precious metal alloy fiberizing bushing having a flange at the top, of the bushing at least one generally vertical side wall, an orifice plate having holes therein, and a perforated plate mounted in the bushing above the orifice plate, and causing the molten material to flow through the holes whereby fibers are formed below the orifice plate of the bushing in a continuous manner, the improvement comprising the wall or walls of the bushing being of such a length that the height of the bushing from the bottom surface of the flange to the top surface of the orifice plate being greater than about 0.2 inch and less than about 0.65 inch, preferably being no more than about 0.5 inch, and most preferably being about 0.4 inch in height. Normally the bushing would have two sidewalls and two endwalls, but two or all of these can be combined into a single wall, such as where the bushing is circular, oval, etc.

The invention further comprises a fiberizing bushing made of precious metal alloy suitable for being electrically heated and having flange means at the top, of the bushing at least one generally vertical side wall, an orifice plate having holes therein, and a perforated plate mounted in the bushing above the orifice plate, the improvement comprising that the at least one sidewall has a height such that the distance between the top surface of said flange means and the bottom surface of said orifice plate exceeds 0.25 inch but not about 0.75 inch, and preferably not exceeding about 0.62 inch, and most preferably not exceeding 0.5 inch. Although not necessary, it is preferred that the sidewalls are turned up extensions of the orifice plate.

DETAILED DESCRIPTION

Figure 1:
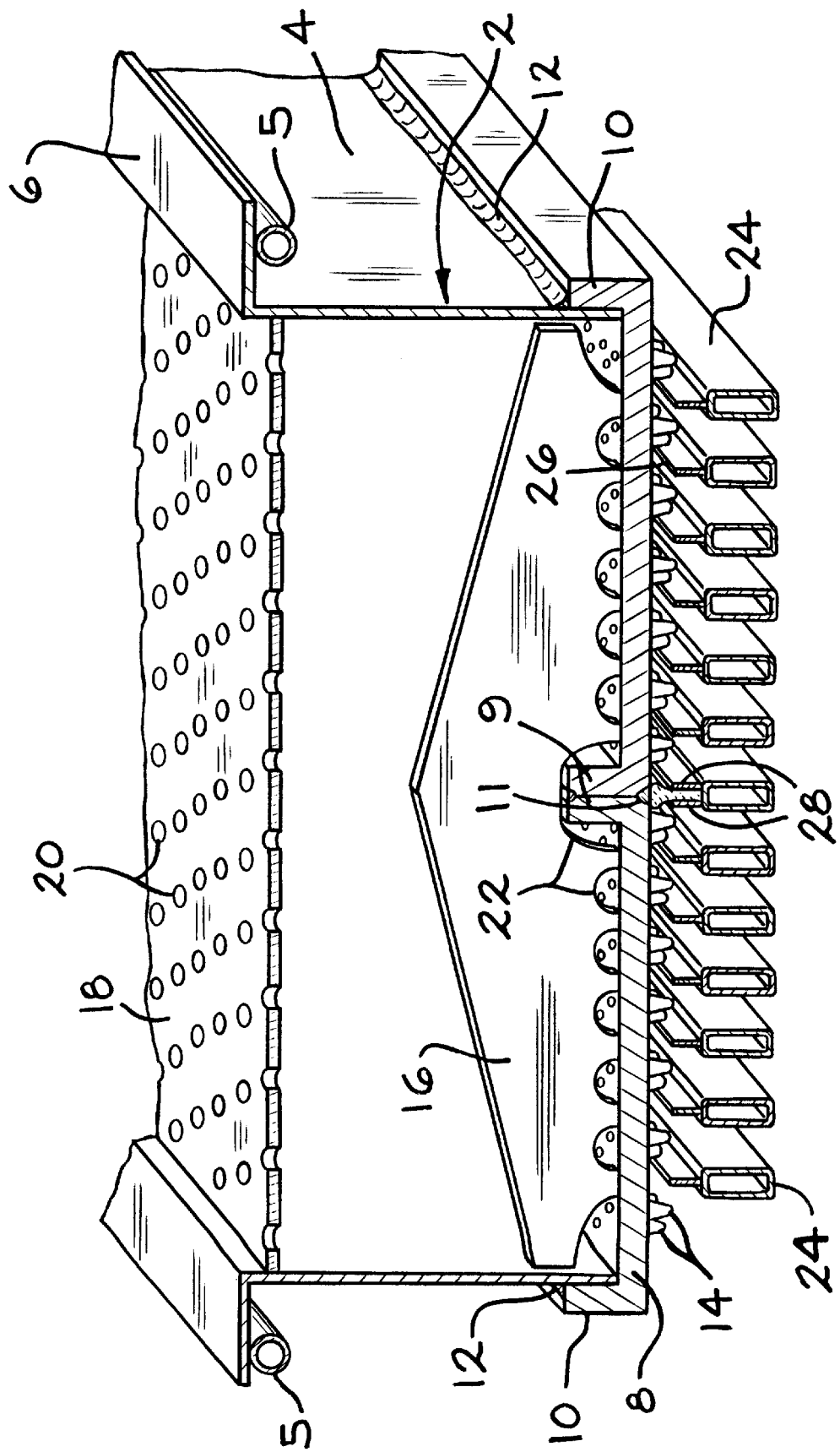
FIG. 1 is a cross-sectional partial perspective view of a typical prior art bushing.

FIG. 1 is a cross-section through the width of a typical precious bushing and related hardware used to form glass fiber from molten glass. The bushing is made from platinum/rhodium alloy having a rhodium content ranging from ten to about thirty percent, typically 20–22 percent. The bushing 2 comprises two sidewalls 4, a flange 6 that extends around the entire upper periphery of the bushing and that is welded to the upper edges of the sidewalls 4 and the upper edges of two endwalls (not shown), an orifice plate 8 having turned up sides 10 for welding to the sidewalls 4 with welds 12, a plurality of hollow nozzles 14 welded to or formed from the orifice plate 8, a plurality of internal supports 16, and a perforated plate or screen 18 having a plurality of openings 20 therein. The distance between the bottom of the flange 6 and the top of the orifice plate 8 is typically 1.6 inches.

The orifice plate 8 in the bushing shown is usually made in two sections and welded together down the center 11. To strengthen this weld, the inside portions of the orifice plate 8 are also turned up along their inside edges to form vertical sections 9. The outer side edges of the orifice plate 8 are also turned up to form short vertical sections 10 for welding to the sidewalls 4. The orifice plate 8 is further strengthened with a plurality of interior supports 16 spaced along the length of the bushing with only their bottom edges attached to the bushing, usually welded to the top surface of the orifice plate 8 between the rows of orifices or nozzles. The internal supports have cutouts 22 above the orifices to not impede the flow of molten glass into the orifices. The outer or side edge portions of the orifice plate 8 are also bent up to vertical and are attached to usually thinner sidewalls 4 with a weld 12.

The upper portion of the sidewalls 4 are bent out to form flanges 6. When the bushing is installed, the upper surface of the flange 6, which extends uninterrupted entirely around the upper periphery of the bushing, will contact, and be held against with well known devices not shown, a refractory surface around an orifice in the bottom of a forehearth. A water cooled coil 5 is also held against the lower surface of the flange 6 to freeze any molten glass attempting to flow between the refractory and the flange thus forming a glass tight seal.

Nozzles or hollow tips 14 that permit molten glass to flow there through to form fibers are formed or attached to the orifice plate 8 before the bushing 2 is assembled in any one of several known methods, such as by extrusion from the orifice plate 8 followed by drilling orifices entirely through the tips 14 and the orifice plate 8, by welding tubular tips into holes in the orifice plate 8, etc. Normally, tips are arranged in rows down the length or along the width of the bushing. In the bushing shown in FIG. 1, the tips 14 are arranged in pairs of rows staggered, running along the length of the bushing in a known manner, e.g., as shown in U.S. Pat. No. 4,337,075, which disclosure is hereby incorporated by reference.

A space is left on the bottom of the orifice plate in between each double row of tips to allow cooling tubes 24, each having a heat removing fin 26 attached to their top surface. A tremendous amount of heat must be removed from the molten glass extruding from the tips 14 at over 2000 degrees F. very quickly and the water cooled tubes 24 with their fins 26 perform this function, supplemental by a flow of air pulled into the area of the tips and fibers by the glass fibers moving rapidly away from the tips 14. Although cooling tubes are now shown on the outside of the outer double rows of tips, it is sometimes preferred to use cooling tubes with single fins in those positions also such that each row of tips is adjacent to a fin and cooling tube and adjacent, but staggered, to another row of tips.

The center cooling tube differs from the other cooling tubes in that it has two fins 28 on its top surface. Fitted between the two fins 28, as will be shown later in more detail, is a ceramic support 11 that contacts the bottom of the orifice plate 8 beneath the weld and runs down the entire length of the bushing to further support the orifice plate 8. The cooling tubes are supported in a well known manner, such as disclosed in U.S. Pat. No. 5,244,483. While the cooling tubes shown here are rectangular in cross-section, they can be oval, round, square, rectangular with radiused ends, etc. as is well know.

This previous bushing design performs very good and is applicable to a wide variety of bushing sizes and types, such as on bushings having 50 or less up to 4000 or more nozzles or tips. A 2158 tip bushing of this design weights about 190 troy ounces, absent the cooling tubes, and has a melt flow rate of more than 160 lbs./hr. on E glass. This design is also usable on other glasses such as C glass and T glass, an improved C type glass. One disadvantage of this design is the large investment required in precious metal, especially at a rhodium price exceeding $3000/T.O. which has occurred in the recent past for periods exceeding two years, making each bushing of this type tie up more than $210,000 of 78% platinum/22% Rhodium. This amounts to a precious alloy requirement of about 1.15 T.O. worth up to about $1128 or more per hourly pound of fiberizing capacity making continuous glass fiber manufacturing facilities extremely capital intensive.

Figure 2:
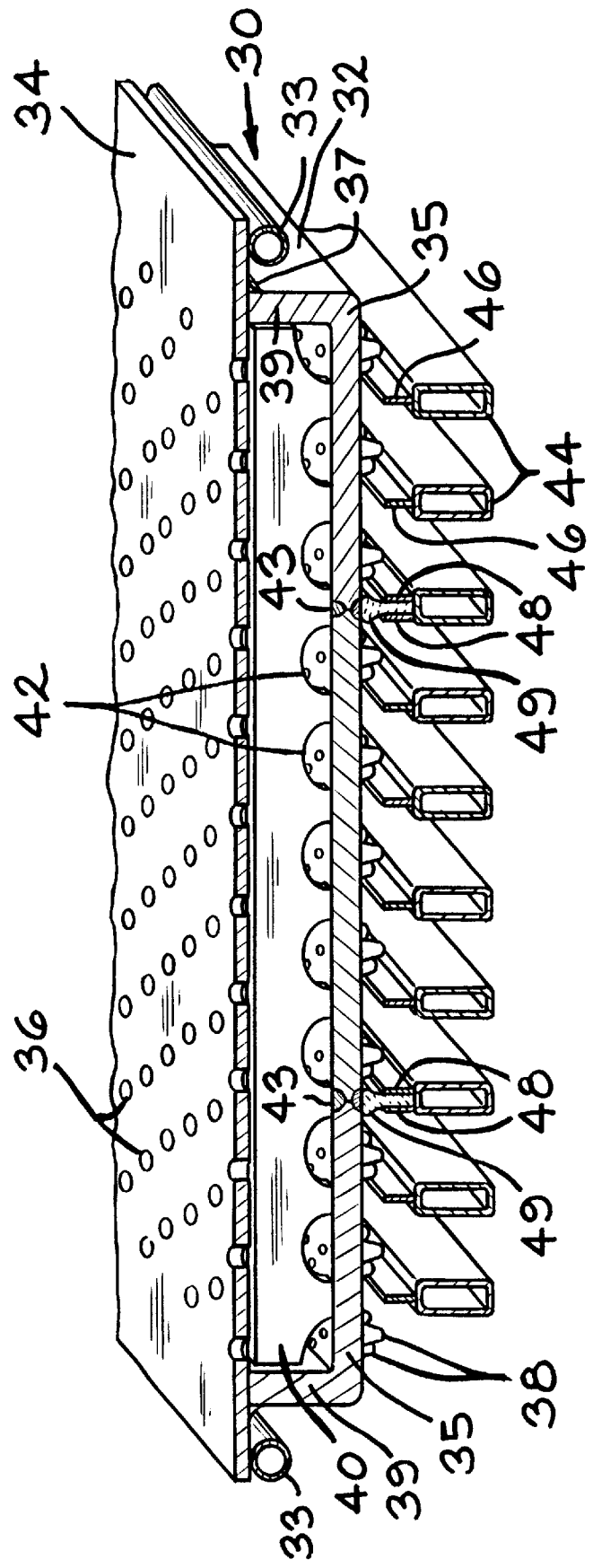
FIG. 2 is a cross-sectional partial perspective view of a bushing of the present invention.
Figure 3:
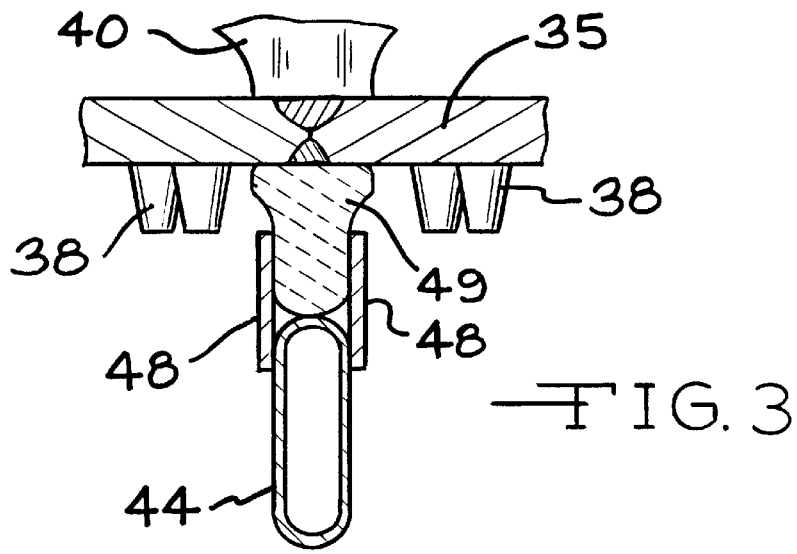
FIG. 3 is a partial cross-sectional view of FIGS. 2 showing more detail of an orifice plate support means.
Figure 4:
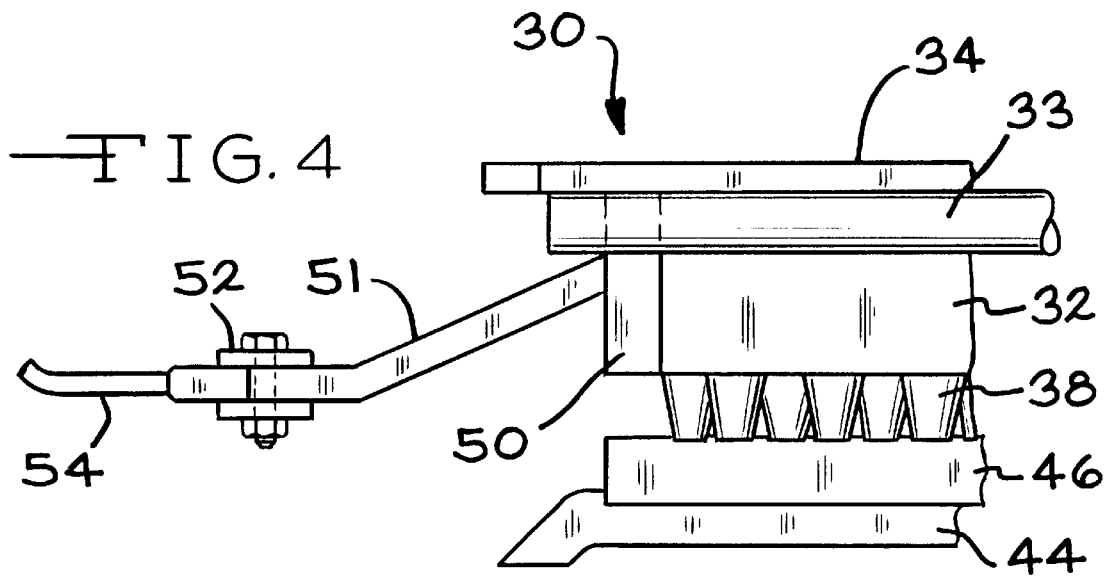
FIG. 4 is a partial front view of the bushing shown in FIG. 2.
Figure 5:
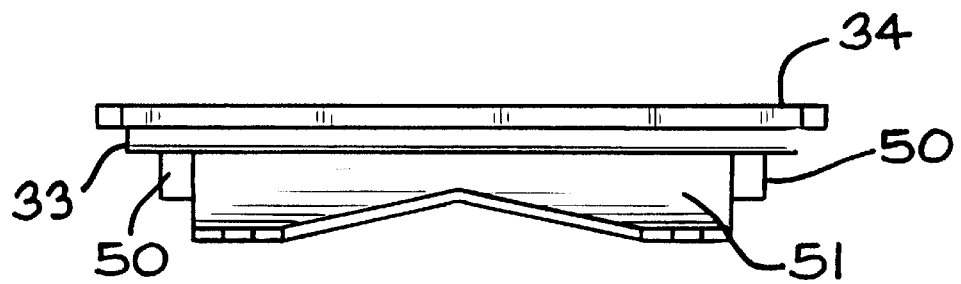
FIG. 5 is an end view of the bushing of FIG. 2, but without the nozzles and cooling tubes shown.

One embodiment of the present invention is shown in FIGS. 2–6. Referring to FIG. 2, bushing 30 is made up of a top plate 34 which serves both as a flange, extending beyond the main body of the bushing entirely around the top periphery of the main body, and as a screen having a plurality of holes 36 spaced apart in the area of plate 34 lying above and within vertical projections of the inside surfaces of the walls of the bushing 30. The flange/screen is preferably about 0.030 inch thick, but can be thinner or thicker if desired and also the corners of the screen-flange plate 34 are chamfered with a 45 degree by about 0.5 inch as shown in FIGS. 4 and 5. The hole size and spacing in the screen area is unchanged from the prior art bushing screens. A hollow tubular loop 33 running almost entirely around the flange of bushing, as shown in FIGS. 4 and 5, and communicating a cooling liquid source and a drain is used under the protruding portions of flange—screen 34 to seal the bushing to the lower surface of a refractory bushing block on the underneath side of the forehearth in the event that molten glass should penetrate the refractory fiber gasket used between the flange 34 and the bushing block. Preferably, the cooling loop is mitered at the four corners to form 90 degree corners with the center line of the tube 33 being about 0.656 inch from the outer surface of the sidewalls 39 and the endwalls 50.

The big difference in the present invention over prior art bushings is the very short side walls and end walls. In the bushing shown in FIG. 2, the entire sidewalls 39 are turned up edges of the orifice plate 35 and the distance from the lower surface of the flange-screen to the upper surface of the orifice plate, i.e., the top surface of the plate from which the nozzles, when used, protrude downwardly from, is about 0.4 inch, compared to about 1.6 inch on a typical prior art bushing. Also, on the 2158 tip bushing shown, the orifice plate 35 is made from three sections welded together by welds 43 down the entire length of the orifice plate but, if the fabricating equipment permitted, it could be made from two pieces or even a single piece would be preferred. Preferably, on a 2158 tip bushing, the orifice plate 35 and sidewalls 39 are about 0.06–0.07 inch thick. Each of the sidewalls 39 is attached to the flange/screen plate 34 by a weld 37 running the entire length of each sidewall along its upper outside edge and the underneath side of the flange/screen 34.

The orifice plate 35 is stiffened by a plurality of internal supports 40, having T shaped cross sections with the top of the T being about 0.25 inch wide and about 0.04 inch thick, inside the body of bushing 30 spaced along the length of, and with their lower edges welded to, the upper surface of the orifice plate 35. Approximately 5/32 inch radiuses 42 are cut out of the lower edge of each support 40 so that the supports 40 do not interfere with the flow of molten glass into the tips 38 in the orifice plate. Preferably, the internal supports 40 are about 0.04 inch thick and have a vertical dimension of about 0.415 inch. These supports are preferably located on about 1.81 inch centers down the length of the bushing with the first and last being spaced 1.81 inches from the inside surface of the end wall 50. They can be spaced farther apart requiring fewer supports, but the bushing life will be shortened and the overall fiberizing efficiency will be reduced, and they can be spaced closer together using more supports, but the additional cost may not be justified. Also, other known designs for internal supports can be used in place of the design shown.

The tips 38 are arranged in double rows and are just like the prior art tips. The inside diameter of the bore in the tip 35 will depend on the type of glass being fiberized, the desired diameter of the fiber product and the capability of the fiber processing equipment being used, but on bushings of this invention, the orifice diameter is enlarged by 0.002–0.003 inch to compensate for the loss in molten glass head above the tips 38 to maintain the same melt flow rate as the bushing type shown in FIG. 1. While the bushing shown in FIG. 2 has eleven double rows of tips 38, a preferred 2158 tip bushing has only ten double rows of tips on the orifice plate 35. Five, and preferably four, double rows of tips lie between the two welds 43 which are preferably about 2.24 inches apart, with three double rows of tips 38 being between each weld 43 and the outside surface of the side wall 39 of the bushing, which preferably is a distance of about 1.57 inches. The distance between the center lines of the row of tips on each side of the weld 43 is about 0.54 inches and the distance from the outside surface of the sidewall 39 to a plane running through centerlines of each of the tips 38 in each outside row of tips is about 0.125 inches. The tips 38 within a row are typically on about 0.15 inch centers and the centerlines of two rows of tips in a pair are spaced apart about 0.13 inch, making all tips in a double row being on about 0.15 inch centers. The distance between the centerline of the first row of tips in a pair and the centerline of the first row of tips in the next pair is typically about 0.52 inches. The tips 38 typically extend about 0.18 inch below the lower surface of the orifice plate 35. The invention is applicable on bushings having from 50 to 4000 or more nozzles or other fiber forming orifice means and is especially effective on bushings having 1600 or more tips.

Cooling tubes 44 having a single fin 46 are used on this bushing with the following difference when the orifice plate 35 is made up of three or more sections. As shown in FIG. 3, a cooling tube 44 with a double fin 48, and equipped with a ceramic support 49, is placed under each weld 43 so that the ceramic bar will contact and support the orifice plate under each weld 43. The ceramic bar is usually made from extruded and sintered alumina or alumina rich refractory. The surface contacting the cooling tube 44 is preferably radiused to allow minimum contact with the cooling tube while the end close to the orifice plate is belled out to create a larger support surface for the orifice plate 35.

Although cooling tubes are not shown on the outside of the outer double row of tips, it is sometimes preferred to use cooling tubes with single fins in those positions also such that each row of tips is adjacent to a fin and cooling tube and adjacent, but staggered, to another row of tips. While the cooling tubes shown here are rectangular in cross-section, they can be round, square, oval, rectangular with radiused ends, etc. and are preferably the latter, as is well known. Conventional cooling fins connected to a water cooled manifold can be used instead of cooling tubes in a known manner and when this method of cooling is used the double rows of tips run across the width instead of down the length of the bushing as is well known.

Referring to FIG. 4, an end wall 50 is welded to each end of the sidewalls 39 and the orifice plate 35 in a conventional manner, and to the lower surface of the flange 34 in the same manner as used to weld the sidewalls 39 to the flange 34. The thickness of the end wall 50 will change depending on many factors as is known, but in the embodiment shown here is about 0.1 inch thick.

Figure 6:
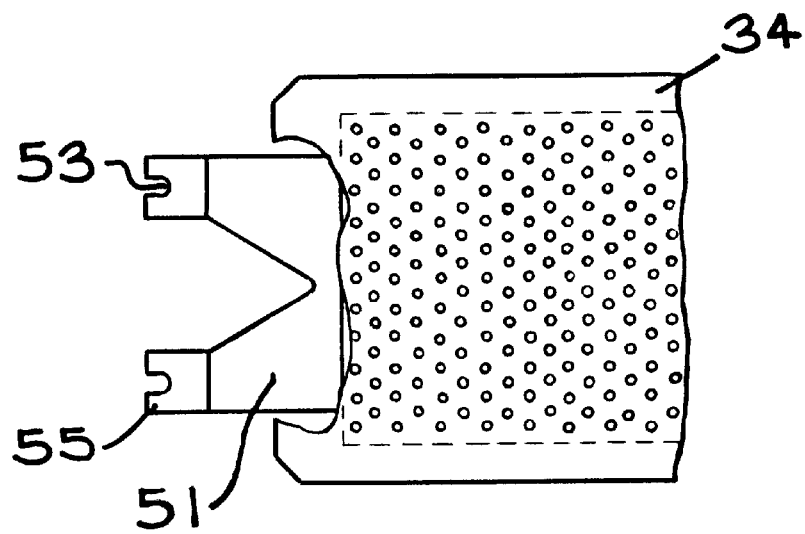
FIG. 6 is a partial plan view of the bushing shown in FIG. 2.

To the outer surface of each end wall 50, in about the center, an ear plate 51 is positioned and welded to be used for connecting the bushing to an electrical source via ear clamps 52 and cables 54. Referring to FIGS. 5 and 6, the ear plate 51 on each end of the bushing looks something like a spread out pair of pants with a waist portion being welded to the end wall all around its contacting edge, the waist portion splitting into two pantleg portions a short distance, e.g. about 0.125 inch or less, from the end wall, and the end or ear portion 55 of each pantleg attachable to an ear clamp 52. A notch 53 is cut out of the end of each ear portion 55 to allow the clamping bolt in the ear clamp 52 to enter the notch thus allowing the ear clamp 52 to grip more of the ear portion 55 if desired.

The ear plate 51 is positioned and welded to each end wall 50 such that the welds are parallel to the orifice plate 35 along the top and bottom bushing edge of the ear plate 51 and such that ear plate 51 is symmetrical with respect to the side edges of end wall 50. The ear plate 51 is welded to the end wall 50 in the upper two thirds of the latter's height and preferably such that the distance from the top edge of the ear plate 51 to the bottom surface of the flange 34 equals the distance from the bottom edge of the ear plate 51 to the top surface of the orifice plate 35. The ear plate is preferably, but not necessarily, attached such that a first portion tilts away from the flange 34 and then bends back to form ear portions which are preferably approximately parallel to the flange 34. This design allows more space for the ear clamp 52.

Figure 7:
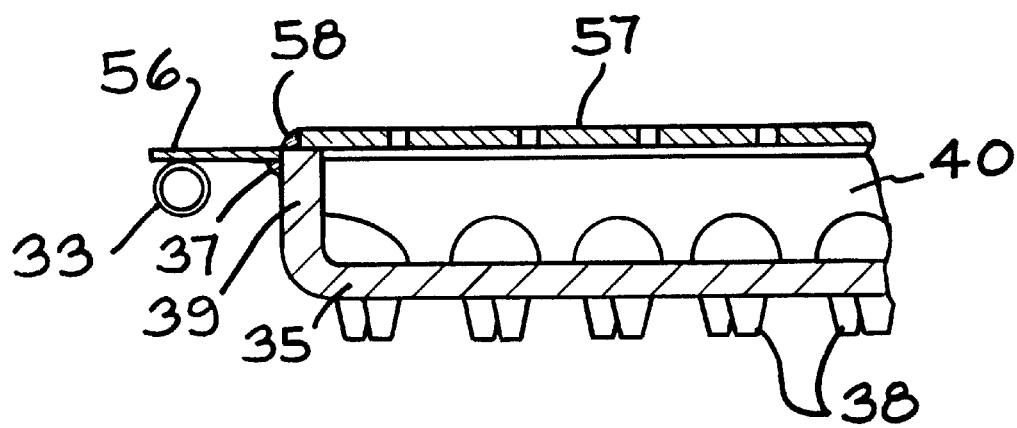
FIGS. 7 and 8 are partial cross-sectional views of bushings showing other embodiments of the present invention.

FIG. 7 shows another embodiment of the invention wherein the flange and the screen are separate and distinct parts. In this embodiment, which otherwise is just like the embodiments disclosed in FIGS. 2–6 and related text, the flange 56 is not part of the screen, but is attached to the side walls 39 and the end walls 50 with the same weld 37. The screen 57 is a separate piece having a length and width slightly smaller than the dimensions of the outer top periphery of the main body of the bushing and a thickness, hole size and pattern the same as screen 34. The screen is then welded to the top of the main body of the bushing, i.e. the tops of side walls 39 and the end walls 50 with weld 58.

Figure 8:
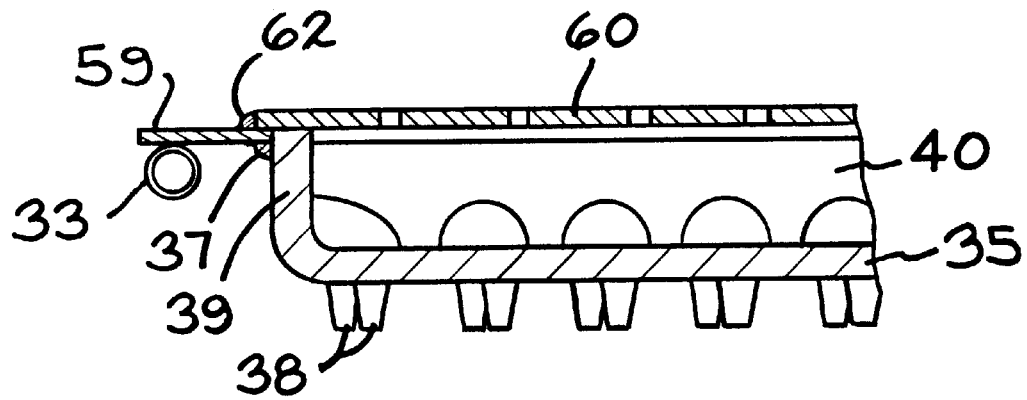

FIG. 8 shows an embodiment slightly different than the previous embodiment in that the length and width of the screen 60 is slightly larger than the main body of the bushing such that the screen 60 is supported by the main body of the bushing but is welded to the top surface of a flange 59 with welds 62 running around the periphery of the screen 60.

Bushings made in accordance with the present invention as disclosed above result in an alloy saving of about 20 percent, which is very substantial, have a lower temperature variation across the orifice plate and have adequate operating life although from experience to date it appears the bushings have to be replaced due to sag somewhat sooner than prior art bushings. Also, this new bushing design requires less fabrication labor and refractory insulation in the mounting frame than the deeper bushings. Finally, when bushings of the present invention are removed from service, the alloy can be reclaimed faster since there is less frozen glass in the bushing which must be removed by chipping and/or dissolution in a dissolving liquid.

Other modifications and embodiments of the invention that still use the inventive portion of the invention will be apparent to those skilled in the art. For example, the two sidewalls and two endwalls could be replaced with a single sidewall. For example, the two sidewalls and two endwalls could be replaced with a single generally vertical wall in a round, oval or other polygonal shape and welded to an orifice plate around its lower periphery.

We claim:

1. In a process of making fiber from a molten material by flowing the molten material into an electrically heated, precious metal alloy fiberizing bushing having a flange at the top of the bushing, at least one generally vertical sidewall, an orifice plate having holes therein, and a perforated plate mounted in the bushing above said orifice plate, and causing the molten material to flow through the holes in said orifice plate whereby fibers are formed below the orifice plate of the bushing in a continuous manner, the improvement comprising the wall or walls of the bushing being of such a height that the height of the bushing from the bottom surface of the flange to the top surface of the orifice plate is greater than about 0.2 inch and less than about 0.65 inch.

2. The process of claim 1 wherein said height of said bushing is less than about 0.5 inch.

3. The process of claim 1 wherein said height of said bushing is about 0.4 inch.

4. The process of any one of claims 1–3 wherein said molten material is glass and wherein nozzles or tips are centered around said holes in said orifice plate and protrude from the lower surface of said orifice plate.

5. A fiberizing bushing made of precious metal alloy suitable for being electrically heated and suitable for fiberizing a molten material, said bushing having a flange at the top of the bushing, at least one generally vertical sidewall, an orifice plate having holes therein, and a perforated plate or screen mounted to the bushing above said orifice plate, the improvement comprising that the height of the at least one generally vertical sidewall is such that the distance between the bottom surface of said flange and the top surface of said orifice plate exceeds 0.2 inch but not about 0.65 inch.

6. The apparatus of claim 5 wherein said distance does not exceed about 0.5 inch.

7. The bushing of claim 6 wherein said distance does not exceed about 0.4 inch.

8. The bushing of any of claims 5–7 wherein said flange and said perforated plate or screen are parts of a single plate of precious metal and wherein nozzles or tips are centered around said holes in said orifice plate and protrude from the lower surface of said orifice plate.

9. The bushing of any one of claims 5–7 wherein said molten material is molten glass.

\* \* \* \* \*